US009778941B2

(12) United States Patent
Omori

(10) Patent No.: US 9,778,941 B2
(45) Date of Patent: Oct. 3, 2017

(54) SUBSTRATE PROCESSING SYSTEM, STORAGE MEDIUM AND METHOD OF REGISTERING NEW DEVICE

(71) Applicant: ASM IP Holding B.V., Almere (NL)

(72) Inventor: Taku Omori, Tokyo (JP)

(73) Assignee: ASM IP HOLDING B.V., Almere (NL)

( * ) Notice: Subject to any disclaimer, the term of this patent is extended or adjusted under 35 U.S.C. 154(b) by 89 days.

(21) Appl. No.: 14/444,107

(22) Filed: Jul. 28, 2014

(65) Prior Publication Data
US 2016/0026480 A1 Jan. 28, 2016

(51) Int. Cl.
G05B 19/418 (2006.01)
H04L 29/06 (2006.01)
G06F 9/445 (2006.01)

(52) U.S. Cl.
CPC ... G06F 9/44505 (2013.01); G05B 19/41845 (2013.01); H04L 63/10 (2013.01)

(58) Field of Classification Search
None
See application file for complete search history.

(56) References Cited

U.S. PATENT DOCUMENTS

| | | | |
|---|---|---|---|
| 6,438,441 B1* | 8/2002 | Jang | G05B 19/41865 257/E21.525 |
| 7,032,029 B1* | 4/2006 | Tanzman et al. | 709/245 |
| 7,330,473 B1* | 2/2008 | Baier | G05B 19/05 370/401 |
| 8,543,233 B2* | 9/2013 | Donati et al. | 700/96 |
| 2002/0055804 A1* | 5/2002 | Betawar | G05B 19/41865 700/117 |
| 2003/0212500 A1* | 11/2003 | Shupe | G01H 1/003 702/33 |
| 2005/0066711 A1* | 3/2005 | Discenzo | G01N 33/2888 73/64.56 |
| 2005/0072217 A1* | 4/2005 | Discenzo | G01N 11/00 73/53.05 |
| 2006/0149418 A1* | 7/2006 | Anvari | 700/245 |
| 2007/0250180 A1* | 10/2007 | Bump et al. | 700/1 |
| 2009/0055013 A1* | 2/2009 | Takizawa et al. | 700/121 |
| 2009/0113376 A1* | 4/2009 | Oh | G06F 17/5068 716/53 |
| 2010/0036517 A1* | 2/2010 | Takizawa et al. | 700/110 |
| 2010/0094981 A1* | 4/2010 | Cordray | G06F 15/177 709/222 |

(Continued)

Primary Examiner — Henry Tsai
Assistant Examiner — Christopher Bartels
(74) Attorney, Agent, or Firm — Studebaker & Brackett PC

(57) ABSTRACT

A substrate processing system includes a main control unit having a configuration file in which ID information and detail information about devices for processing a substrate is recorded, the detail information includes information needed for controlling the devices, and a module controller having a list file obtained by converting the configuration file into a readable form, the module controller controlling the devices described in the list file on the basis of instructions from the main control unit. The module controller automatically adds, to the list file, ID information and detail information about a new device newly connected to the module controller to establish a condition under which the new device can be controlled.

15 Claims, 3 Drawing Sheets

(56) References Cited

U.S. PATENT DOCUMENTS

| | | | |
|---|---|---|---|
| 2011/0232588 A1* | 9/2011 | Liu | F01K 17/04 |
| | | | 122/451 R |
| 2012/0226368 A1* | 9/2012 | Thomson | G05B 19/0426 |
| | | | 700/87 |
| 2013/0080585 A1* | 3/2013 | Schaffner | H04L 67/10 |
| | | | 709/217 |
| 2014/0152103 A1* | 6/2014 | Schauer | G06F 13/105 |
| | | | 307/31 |

* cited by examiner

SUBSTRATE PROCESSING SYSTEM, STORAGE MEDIUM AND METHOD OF REGISTERING NEW DEVICE

BACKGROUND OF THE INVENTION

Field of the Invention

The present invention relates to a substrate processing system for processing a substrate by freely using devices, a storage medium provided in the substrate processing system and a method of registering a new device newly added to the substrate processing system.

Background Art

US2009/055013A1 discloses a substrate processing system provided with a main control unit (Unique Platform Controller (UPC)) and a module controller. The main control unit and the module controller control a plurality of devices.

The main control unit has a configuration file in which information on devices to be controlled is recorded. The module controller has a list file obtained by converting the configuration file into a form readable with the module controller. The module controller controls the devices described in the list file.

A new device may be connected to the module controller. Processing a substrate by controlling the new device requires addition of information on the new device to the configuration file and rebooting the main control unit and the module controller. There is a problem that the time period required for modification of the configuration file and reboot of the main control unit and the module controller is long. This leads to other problems. For example, reduction in temperature or a change in atmosphere occurs in the chambers constituting the devices, and it takes time to return the devices to the states in which they are able to process the substrate.

SUMMARY OF THE INVENTION

In view of the above-described problems to be solved, object of the present invention is to provide a substrate processing system capable of setting a new device in a controllable state by a simple method, a storage medium and a method of registering a new device.

The features and advantages of the present invention may be summarized as follows.

According to one aspect of the present invention, a substrate processing system includes a main control unit having a configuration file in which ID information and detail information about devices for processing a substrate is recorded, the detail information includes information needed for controlling the devices, and a module controller having a list file obtained by converting the configuration file into a readable form, the module controller controlling the devices described in the list file on the basis of instructions from the main control unit. The module controller automatically adds, to the list file, ID information and detail information about a new device newly connected to the module controller to establish a condition under which the new device can be controlled.

According to another aspect of the present invention, a computer-readable storage medium storing a program for causing a computer to execute a process, includes checking whether or not a new device exists which is not registered in a module controller but is actually connected to the module controller, obtaining ID information about the new device when the new device is found in the checking, obtaining detail information about the new device by communicating with the new device and by associating the detail information with the ID information, and registering the ID information and the detail information in the module controller so that the module controller can control the new device.

According to another aspect of the present invention, a method of registering a new device, includes the steps of causing a module controller controlling a plurality of devices under an instruction from a main control unit to obtain ID information about a new device newly connected to the module controller, and causing the module controller to communicate with the new device and obtain detail information about the new device while associating the detail information with the ID information so that the module controller can control the new device.

Other and further objects, features and advantages of the invention will appear more fully from the following description.

DETAILED DESCRIPTION OF THE PREFERRED EMBODIMENT

Figure 1:
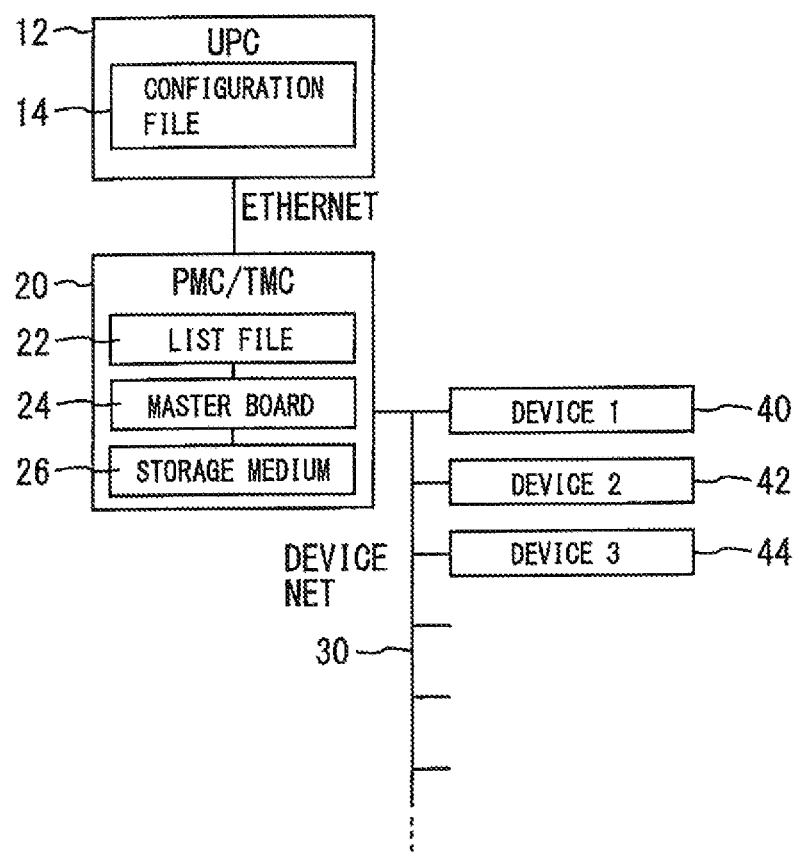
FIG. 1 is a block diagram of a substrate processing system according to an embodiment of the present invention.

A substrate processing system, a storage medium and a new device registration method according to an embodiment of the present invention will be described with reference to the drawings. Components identical or corresponding to each other are indicated by the same reference characters and descriptions of such components are omitted in some case.

Embodiment

FIG. 1 is a block diagram of a substrate processing system 10 according to an embodiment of the present invention. The substrate processing system 10 is provided with a main control unit 12 and a module controller 20. The main control unit 12 controls the module controller 20. Devices 40, 42, and 44 are connected to the module controller 20 through an interface 30. The module controller 20 is instructed by the main control unit 12 to control the devices 40, 42, and 44.

The kinds of devices 40, 42, and 44 are not particularly specified, provided that they process a substrate. The device 40, 42, or 44 is for example, a mass flow controller (MFC), an automatic pressure controller (APC), a susceptor motor, or an RF generator. The interface 30 connects the module controller 20 and the devices 40, 42, and 44 that process a substrate to each other. The interface 30 is, for example, Device Net, a product from OMRON Corporation.

A description of the main control unit 12 will be made. The main control unit 12 is constituted by a UPC for example. A configuration file 14 is recorded in the main control unit 12. In the configuration file 14, ID information, communication data size information and kind information about the devices 40, 42, and 44 are recorded.

ID information about one of the devices is, for example, a Media Access Control (MAC) address assigned to the device. Communication data size information about one of the devices is information on the size of data input to the device and the size of data output from the device. It is necessary to make the input data size and the output data size equal to each other. For example, if the device is an MFC, a communication data size of 4 bytes, which is the sum of 2 bytes of flow rate data and 2 bytes of pressure data, is required. In this case, the communication data size information is "4 bytes". The communication data size may also be referred to as "I/O size".

Kind information is information for identification of the kind of the device. From kind information about one of the devices, determination can be made as to whether the device is an MFC, an APC, a susceptor motor, an RF generator, or some other device.

The configuration file 14 can be modified by an operator using an editor on a screen. On the screen (editor), MAC addresses 0 to 63 for example are arranged in a column in this order to indicate assignments of the MAC addresses to the devices. With the assignment of one of the devices to one of the MAC addresses, communication data size information and kind information about the device are also displayed. The operator can assign one of the devices to one of the MAC addresses and determine communication data size information and kind information about the device.

A description of the module controller 20 will be made. In the module controller 20, a list file 22 obtained by converting the configuration file 14 into a form readable with the module controller 20 (computer) is recorded. The list file is automatically generated in the main control unit 12 when the main control unit 12 is rebooted. The list file automatically generated in the main control unit is downloaded to the module controller 20 when the module controller 20 is rebooted.

The module controller 20 is provided with a master board 24. The master board 24 controls the devices 40, 42, and 44 described in the list file 22 on the basis of instructions from the main control unit 12. The module controller 20 is provided with a storage medium 26. A program readable with a computer is recorded on the storage medium 26.

The normal operation of the substrate processing system 10 will be described. The main control unit 12 first determines a sequence of processing on a substrate and a recipe of processing on the substrate by its scheduler function. The module controller 20 causes the devices described in the list file 22 to process the substrate in accordance with the substrate processing sequence and recipe determined by the main control unit 12. Since the devices 40, 42, and 44 are registered in the list file 22, these devices operate for processing on the substrate.

Figure 2:
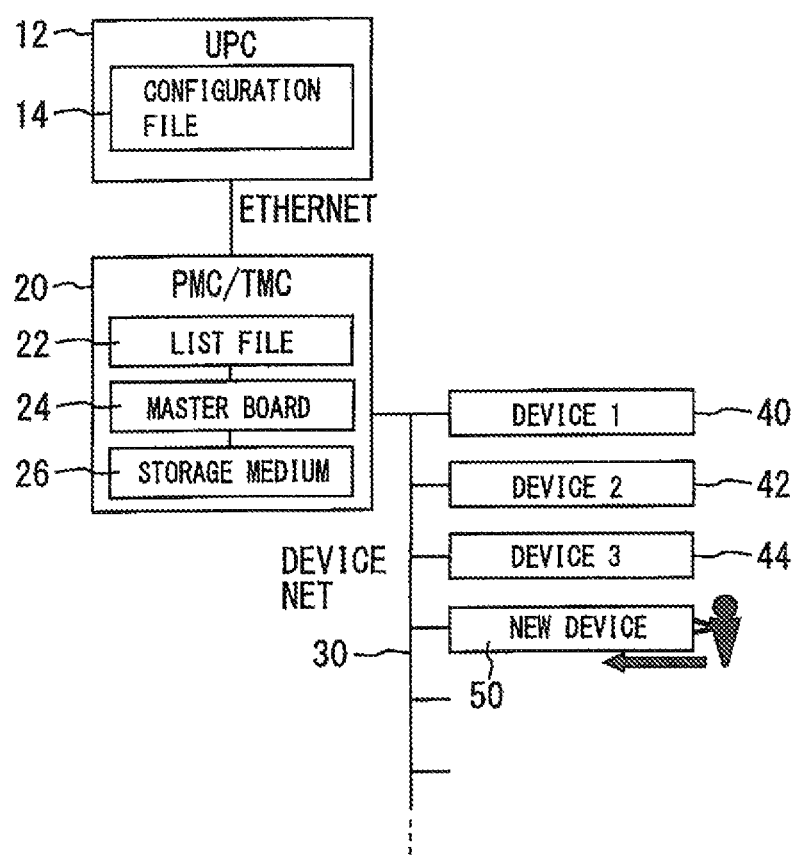
FIG. 2 is a diagram showing a state in which a new device is connected to the module controller through the interface.

The operation of the substrate processing system 10 when a new device is connected to the module controller 20 will be described. A device newly connected to the module controller 20 is referred to as a new device. FIG. 2 is a diagram showing a state in which a new device 50 is connected to the module controller 20 through the interface 30. An operator physically connects the new device 50 to the interface 30 in a state where the power supply to the interface 30 is off. The new device 50 is a device which is not described in the list file 22 (not registered in the module controller 20) but is actually connected to the module controller 20.

Figure 3:
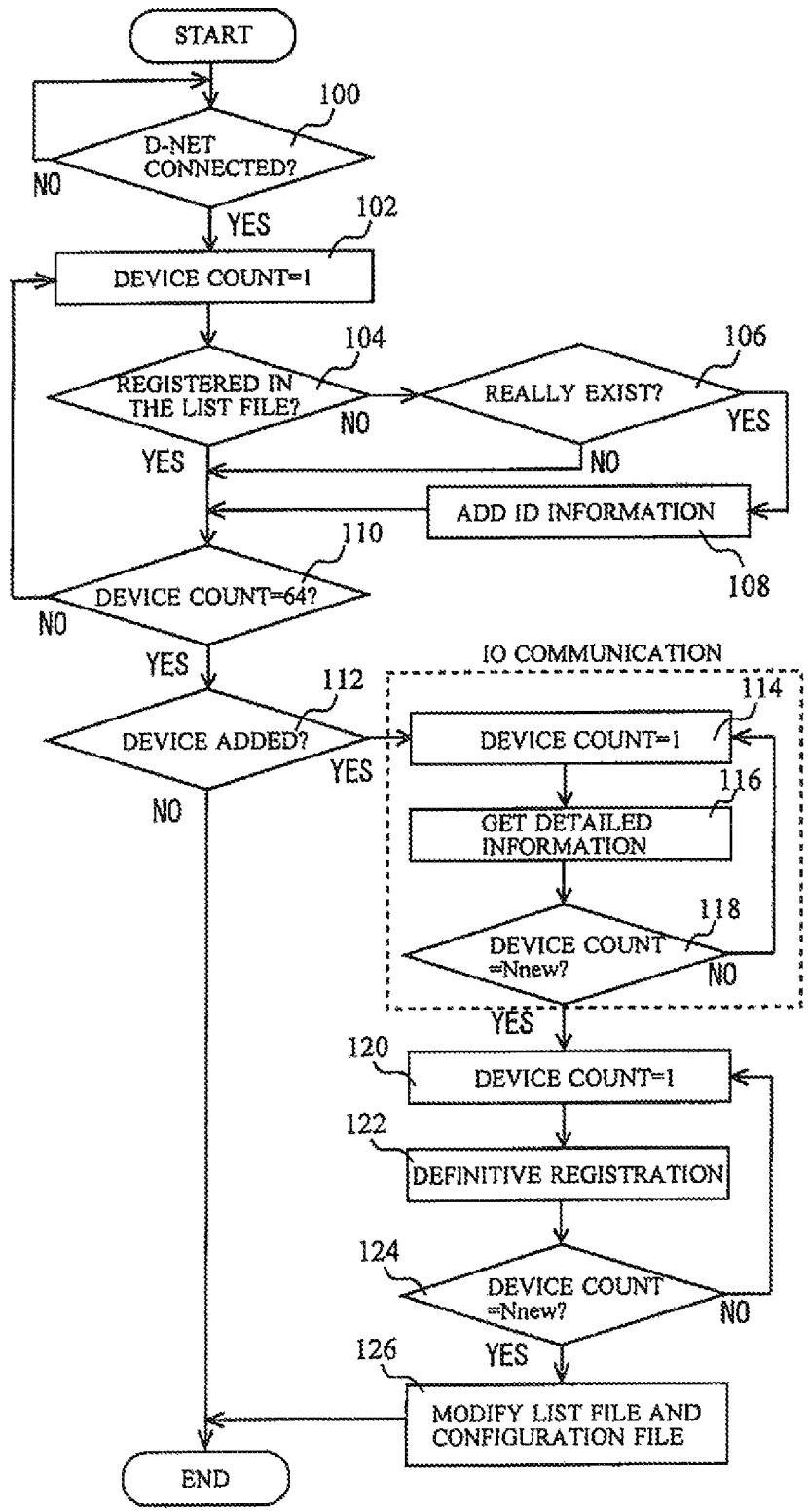
FIG. 3 is a flowchart showing the operation of a computer in accordance with the program recorded on the storage medium.

When a transition from an off state to an on state of the power supply for the interface 30 is made, the operation in accordance with the program recorded on the storage medium 26 is started. FIG. 3 is a flowchart showing the operation of a computer (master board 24) in accordance with the program recorded on the storage medium 26.

When a transition from an off state to an on state of the power supply for the interface 30 is made, the process is advanced from step 100 to step 102. In step 102, determination is made by referring to the list file 22 as to whether or not one of the devices has been assigned to the first MAC address (MAC address 1) in the 64 MAC addresses.

If the device 40 has been assigned to the MAC address 1, the process advances to step 110. The process then returns to step 102 and determination is made as to whether or not one of the devices has been assigned to the second MAC address (MAC address 2) in the 64 MAC addresses. If the device 42 has been assigned to the MAC address 2, the process advances to step 110. The process then returns to step 102 and determination is made as to whether or not one of the devices has been assigned to the third MAC address (MAC address 3) in the 64 MAC addresses. If the device 44 has been assigned to the MAC address 3, the process advances to step 110.

The process then returns to step 102 and determination is made as to whether or not one of the devices has been assigned to the fourth MAC address (MAC address 4) in the 64 MAC addresses. Since no device has been assigned to the MAC address 4 in the list file 22, the process advances from step 104 to step 106. In step 106, a check is made as to whether or not one of the devices is connected to the port of the interface 30 corresponding to the MAC address 4.

If the new device 50 has been connected to the port corresponding to the MAC address 4, it is determined that the device (new device 50) has actually been assigned to the MAC address 4, and the process advances to step 108. In step 108, the module controller 20 obtains ID information about the new device 50. The ID information about the new device 50 is held in the module controller 20, for example, by being stored in a memory on the master board 24. The ID information about the new device 50 is, for example, the MAC address 4.

With respect to the MAC addresses 5 to 63, no devices have been assigned on the list file 22 and on the actual configuration and, therefore, processing starting from step 104 and returning to step 104 via steps 106, 110, and 102 is repeated. Thus, steps 102, 104, 106, and 110 form a process in which the program on the storage medium 26 causes the master board 24 to check the existence/nonexistence of a new device. Steps 102, 104, 106, and 110 are therefore referred to as checking steps. Details of the checking steps may be changed as desired as long as they check whether a new device has been assigned to one of the MAC addresses recognized by the computer (module controller 20) as being without any device assigned thereto.

Step 108 is a process step for obtaining ID information about a new device when the new device is found by the checking steps. Step 108 is therefore referred to as an ID acquisition step.

The process is then advanced to step 112. In step 112, determination as to the existence/nonexistence of a new device is made. Since the new device 50 exists as described above, the process advances to step 114. In step 114, ID information about the first new device (new device 50) is identified. The process then advances to step 116. In step 116, the module controller 20 communicates with the new device 50 and obtains information about details of the new device 50 while associating this detail information with the ID information about the new device 50. The detail information includes communication data size information and kind information about the new device 50.

The process then advances to step 118. In step 118, determination is made as to whether or not detail information about all new devices has been obtained. Since the number of new devices ($N_{NEW}$) is 1, the process advances from step 118 to step 120. Steps 114 to 118 form a process in which the program on the storage medium 26 causes the master board 24 to obtain detail information of a new device. Steps 114 to 118 are therefore referred to as information acquisition steps.

In step 120, the ID information about the first new device (new device 50) is identified. The process then advances to step 122. In step 122, the detail information about the new device 50 is recorded (registered) in the memory on the master board 24 while being associated with the ID information about the new device 50. Subsequently, determination is made in step 124 as to whether or not detail information about all the new devices has been recorded in the memory on the master board. Since the number of new devices ($N_{NEW}$) is 1, the process advances from step 124 to step 126.

In step 126, the detail information (communication data size information and kind information) about the new device 50 recorded in the memory on the master board 24 is added to the list file 22 while being associated with the ID information. Further, the module controller 20 adds the ID information, communication data size information and kind information about the new device 50 to the configuration file 14.

Thus, steps 120 to 126 form a process in which ID information, communication data size information and kind information are registered in the module controller 20 to enable the module controller 20 to control the new device 50. Steps 120 to 126 are therefore referred to as registration steps.

As described above, the program recorded on the storage medium 26 causes the computer (master board 24) to execute the checking steps, the ID acquisition step, the information acquisition steps and the registration steps. After the completion of these steps, the module controller 20 can control the new device 50 to process the substrate.

In the substrate processing system 10 according to the embodiment of the present invention, the program on the storage medium 26 automatically set a condition under which the module controller 20 can control the new device 50 after the new device 50 is connected to the module controller 20. The information about the new device is also added to the configuration file. There is, therefore, no need to rewrite the configuration file 14 and no need to reboot the main control unit 12 and the module controller 20, for an operator.

As described above, the essential feature of the present invention resides in that the module controller automatically adds ID information, communication data size information and kind information about a new device to the list file to establish a condition under which the new device can be controlled. The substrate processing system and the storage medium according to the present embodiment can be variously changed as long as the feature of the present invention is secured.

For example, while use of the MAC address as ID information has been described, ID information other than the MAC address may be adopted if it provides unique data for identification of each device. The arrangement may alternatively be such that the program on the storage medium 26 causes the master board 24 to execute a step of providing ID information and detail information about a new device to the main control unit 12, and the main control unit 12 executes addition of these sorts of information to the configuration file 14.

If the main control unit 12 and the module controller 20 are rebooted before information about a new device is added to the configuration file 14, a list file not containing the information about the new device is generated and the information added to the list file 22 by the program on the storage medium 26 is lost. Therefore, the information about the new device is added to the configuration file before rebooting of the main control unit 12. In other words, addition of ID information and detail information about a new device to the configuration file 14 may be executed by any timing before rebooting of the main control unit 12.

The method of registering a new device according to the present invention is characterized by including the step in which the module controller 20 obtains ID information about a new device, and the step in which the module controller obtains detail information while associating the detail information with the ID information to become able to control the new device. The new device registration method according to the present invention can be variously modified as long as this feature is secured.

The detail information is not limited to the communication data size information and kind information. In other words, the content of the detail information may be changed as long as the detail information includes information needed for controlling the device. For example, the content of the detail information may be changed in accordance with the type of the substrate processing system.

What is claimed is:

1. A substrate processing system comprising:
a main control unit having a configuration file in which identification information and detail information about devices is recorded, the detail information includes information needed for controlling the devices, the devices being configured to process a substrate; and
a module controller having a list file obtained by converting the configuration file, in which the identification information and the detail information about the devices for processing the substrate and for controlling the devices is recorded, into a readable form, the module controller controlling the devices for processing the substrate described in the list file on the basis of instructions from the main control unit having the configuration file,
wherein the module controller automatically adds, to the list file, identification information and detail information about a new device newly connected to the module controller to establish a condition under which the new device can be controlled without rebooting the main control unit, the new device being configured to process the substrate.

2. The substrate processing system according to claim 1, wherein the module controller adds the identification information and the detail information about the new device to the configuration file.

3. The substrate processing system according to claim 1, wherein the module controller first obtains the identification information about the new device, and thereafter obtains the detail information about the new device by communicating with the new device and by associating the detail information about the new device with the identification information about the new device.

4. The substrate processing system according to claim 3, further comprising an interface that connects the devices and the module controller to each other, wherein the module controller checks whether or not the new device exists when a transition from an off state to an on state of a power supply for the interface is made and, if the new device exists, obtains the identification information about the new device.

5. The substrate processing system according to claim 1, wherein the main control unit determines a sequence of processing on the substrate and a recipe of processing on the substrate, and
wherein the module controller causes the devices to process the substrate in accordance with the substrate processing sequence and the recipe determined by the main control unit.

6. The substrate processing system according to claim 1, wherein the detail information about the devices includes communication data size information and kind information about the devices, and the detail information about the new device includes communication data size information and kind information about the new device.

7. The substrate processing system according to claim 1, wherein the substrate processing system is configured to determine whether one of the devices or the new device is a mass flow controller, an automatic pressure controller, a susceptor motor, an RF generator, or some other device.

8. A computer-readable storage medium storing a program for causing a computer to execute a process for a substrate processing system comprising:
a main control unit having a configuration file in which identification information and detail information about devices is recorded, the detail information includes information needed for controlling the devices, the devices being configured to process a substrate; and
a module controller having a list file obtained by converting the configuration file, in which the identification information and the detail information about the devices for processing the substrate and for controlling the devices is recorded, into a readable form, the module controller controlling the devices for processing the substrate described in the list file on the basis of instructions from the main control unit having the configuration file,
wherein the module controller automatically adds, to the list file, identification information and detail information about a new device newly connected to the module controller to establish a condition under which the new device can be controlled without rebooting the main control unit, the new device being configured to process the substrate,
the process comprising:
checking whether or not the new device exists which is not registered in the module controller but is actually connected to the module controller;
obtaining the identification information about the new device when the new device is found in the checking;
obtaining the detail information about the new device by communicating with the new device and by associating the detail information with the identification information; and
registering the identification information and the detail information in the module controller so that the module controller can control the new device.

9. The storage medium according to claim 8, wherein the checking includes checking whether or not the new device has been assigned to a MAC address recognized by the computer as being without any device assigned thereto.

10. The storage medium according to claim 8, wherein the program causes the computer to execute a process of adding the identification information and the detail information to a configuration file recorded in a main control unit controlling the module controller.

11. The storage medium according to claim 8, wherein the detail information includes communication data size information and kind information about the new device.

12. The storage medium according to claim 8, wherein the substrate processing system is configured to determine whether one of the devices or the new device is a mass flow controller, an automatic pressure controller, a susceptor motor, an RF generator, or some other device.

13. A method of registering a new device for a substrate processing system comprising:
a main control unit having a configuration file in which identification information and detail information about devices is recorded, the detail information includes information needed for controlling the devices, the devices being configured to process a substrate; and
a module controller having a list file obtained by converting the configuration file, in which the identification information and the detail information about the devices for processing the substrate and for controlling the devices is recorded, into a readable form, the module controller controlling the devices for processing the substrate described in the list file on the basis of instructions from the main control unit having the configuration file,
wherein the module controller automatically adds, to the list file, identification information and detail information about a new device newly connected to the module controller to establish a condition under which the new device can be controlled without rebooting the main control unit, the new device being configured to process the substrate,
the method comprising the steps of:
causing the module controller controlling the devices under an instruction from the main control unit to obtain the identification information about the new device newly connected to the module controller; and
causing the module controller to communicate with the new device and obtain the detail information about the new device while associating the detail information with the identification information so that the module controller can control the new device.

14. The method of registering a new device according to claim 13, wherein the detail information includes communication data size information and kind information about the new device.

15. The method of registering a new device according to claim 13, wherein the substrate processing system is configured to determine whether one of the devices or the new device is a mass flow controller, an automatic pressure controller, a susceptor motor, an RF generator, or some other device.

* * * * *